Figure 1:
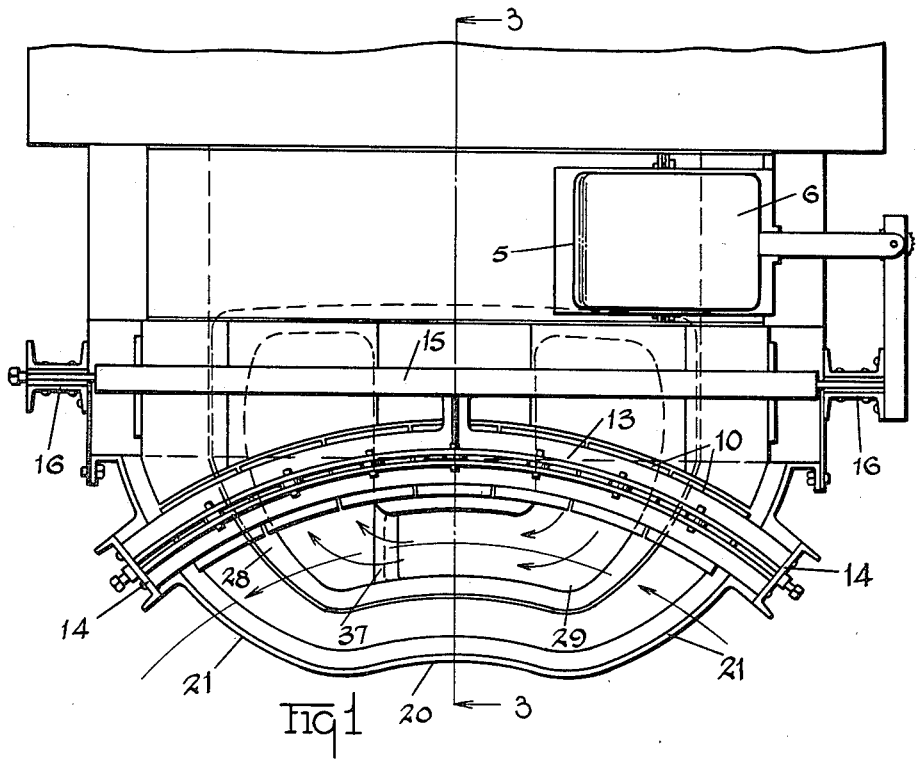

Nov. 17, 1936.  F. G. SCHWALBE  2,061,213

GLASS TANK FEEDING SHELF

Filed April 15, 1935  2 Sheets-Sheet 1

Inventor
Franz G. Schwalbe
By Faust F. Crampton
Attorney

Nov. 17, 1936.  F. G. SCHWALBE  2,061,213
GLASS TANK FEEDING SHELF
Filed April 15, 1935  2 Sheets-Sheet 2
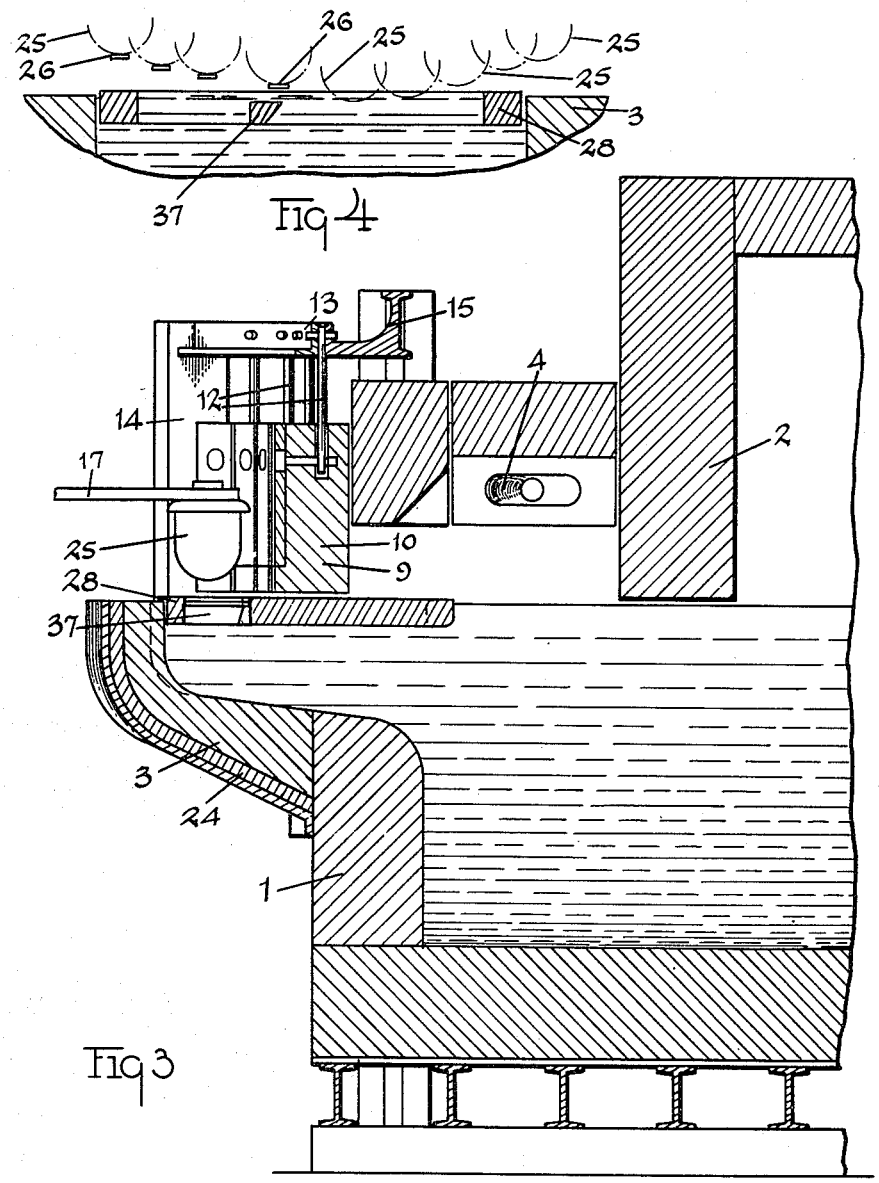
Inventor
Franz G. Schwalbe
By Faust F. Crampton
Attorney Patented Nov. 17, 1936

2,061,213

UNITED STATES PATENT OFFICE 2,061,213

GLASS TANK FEEDING SHELF

Franz G. Schwalbe, Toledo, Ohio, assignor to Toledo Engineering Company, Incorporated, Toledo, Ohio, a corporation of Ohio Application April 15, 1935, Serial No. 16,272

3 Claims. (Cl. 49—56)

My invention has for its object to provide means whereby the temperature of the glass in glass feeding shelves of glass furnaces is maintained at a substantially constant high temperature to produce uniform viscosity of the glass that is drawn into the gathering or article shaping molds and thus form each article from glass of uniform character and produce articles uniform in appearance. The invention thus eliminates the formation of lines that appear refractively in glass articles formed from glass, portions of which have different degrees of viscosity.

The invention provides a cover plate formed of refractory material and floatable on the surface of the glass and conforming along one side edge thereof to the inside edge of the shelf and having a width sufficiently great to locate the inner side edge of the floatable member well within the furnace and having an opening for receiving gathering molds and extending well into the furnace whereby the chilled exposed glass may be directed inwardly into the furnace and the hot glass may be drawn outwardly from the furnace by the sweeping movement of the glass molds in the opening as glass is drawn into the molds by suction.

The invention is of particular advantage when used in forming articles from colored glass. The colored glass resists heat radiation therethrough, and consequently the maximum temperature of the glass in the furnace is limited to the glass near the surface, the body of the glass being heated largely by heat of conduction and convection while the glass in proximity to the surface is heated not only by conduction and convection, but also by radiation.

The invention also provides a bridge part slightly submerged below the surface of the glass and located substantially at the position where the molds leave the glass surface in the gathering shelf, the bridge operating to prevent return movement of glass severed from withdrawing molds and possible clogging of that portion of the opening of the floatable member from whence the glass is drawn by the molds, the sweep of the molds in the opening tending, however, to move the surface glass into the furnace and to draw the hot glass from the furnace into the part of the opening from whence the glass is drawn by the molds.

The invention also provides a depending wall extending to near the glass surface and close to or in contact with the floatable member which affords spaces between the glass within the opening and the lower end of the overhanging wall to permit a free flow of glass into and from the furnace and form "sting-outs" from the furnace on the colder glass that is moved into the furnace to maintain the temperature of the surface glass that is moved from the furnace.

The invention consists in other features which will appear from the following description and upon examination of the drawings. To illustrate a practical application of the invention, I have selected a glass feeding shelf as an example of the various structures and the details of such structures that contain the invention and shall describe the selected structure hereinafter. The particular structure selected is shown in the accompanying drawings.

Figure 2:
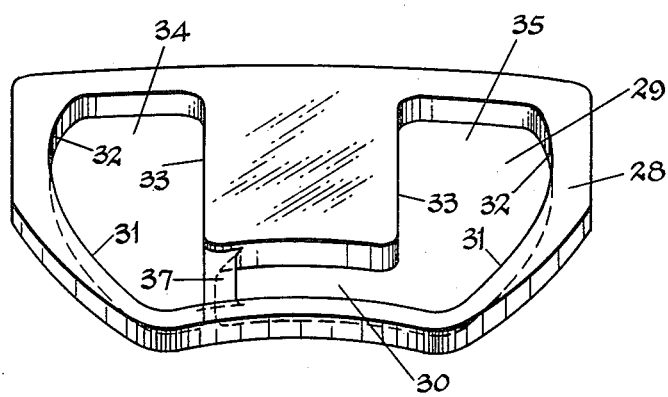

Fig. 1 is a top view of the shelf, Fig. 2 is a perspective view of the floatable member, and Fig. 3 is a view of the vertical section taken on the line 3—3 indicated in Fig. 1. Fig. 4 is a diagrammatic illustration of the movement of a mold as it enters and withdraws from the opening in the floatable cover member.

The furnace 1 may be provided with the usual depending wall 2 that overhangs the surface of the glass in the furnace and a shelf part 3 that protrudes from the body of the furnace. The furnace is provided with a burner 4 located in position to heat the glass of the furnace in the vicinity of the shelf. If desired, a suitable stack pipe or flue 5 having a damper 6 may be provided for permitting the escape of the products of combustion produced by the burners, such as the burner 4, from within the furnace.

The furnace has a wall 9 that overhangs the surface of the glass in the shelf. The wall 9 is formed of a plurality of refractory blocks 10. The blocks 10 are supported by means of rods 12 that are connected to a beam 13 on which is supported on the ends of the uprights 14 located on the ends of the shelf 3. The beam 13 may be stayed by means of the beam 15 to which it may be connected by a bracket or other part. The beam 15 is connected to the buck stays 16 of the furnace.

The wall 9 extends to near the surface of the glass and forms a vertical substantially cylindrical wall, concave on its exterior surface and extending from one end of the shelf 3 to the other end. Its concavity conforms substantially to the path of movement of the gathering molds as they are rotated with reference to the shelf.

The front central side part 20 of the shelf is also concavedly curved and the end parts 21 of the shelf are convexedly curved to substantially the side wall of the furnace. The bottom 24 of the shelf slopes rearwardly and downwardly towards the side wall of the furnace and thus enables the location of the base of a glass forming machine in close proximity to the furnace and in a position to support the molds that move over the shelf with considerable stability.

The molds 25 are supported on suitable arms 17. The machine is provided with a single shearing knife 26, or a plurality of shearing knives associated with each mold, for severing the glass gobs that cling to the molds and are drawn from the surface of the glass in the glass shelf by reason of the viscosity of the glass. When sheared, the glass thus drawn from the shelf falls back into the glass of the shelf.

The glass in the shelf and in the furnace is normally slightly below the level of the edge or lip of the shelf, and consequently the glass in the shelf is shallow relative to the depth of the glass in the furnace and, therefore, has less body and by radiation loses a considerable heat which increases its viscosity. Also, the surface glass is chilled by direct radiation and exposure to the atmosphere and by contact with the molds.

By my invention I provide a floatable refractory member 28 that substantially covers the entire area of the glass in the shelf and also extends rearwardly under the wall 9 and well into the furnace and is floatably supported on the glass in contact with or in close proximity to the lower end of the wall 9. The outer edge of the floatable member fits the inner edge of the glass shelf. The floatable cover member 28 is provided with an opening 29. The edges of the cover member 28 that define the central part 30 of the opening are curved to conform to the path of the movement of the molds as they enter the glass to gather by suction the glass from the glass shelf and move circularly and sweep along the glass surface. The ends of the curved central portion 30 of the opening extend rearwardly into the furnace and are defined by curved edges 31 that follow substantially the curved edges of end parts of the cover member 28 and the edges 32 and 33 that extend rearwardly into the furnace. The edges 33 thus, if desired, may be substantially straight edges. The edges 32 and 33 form wide open areas 34 and 35 where the glass in the opening 29 is exposed to the direct heat of the furnace. This arrangement prevents downward movement of the hotter glass under any part of the member immediately in advance of its entrance into the part of the opening where the hot glass is gathered by the molds.

The portions 34 and 35 are progressively increased in width from the point where they communicate with the central portion 30 to enable the free movement of the colder glass into the furnace and free movement of the hot glass from the furnace into the curved portion 30 of the opening into which the molds dip to gather the hot glass.

Preferably, the cover member 28 is provided with a bridge 37 that extends across the curved central portion 30 of the opening 29. Preferably, the bridge is located at one end of the edge portions that define the central curved portion 30 of the opening. The bridge is so disposed with reference to the member 28 that when the member 28 is located in the glass, the top of the bridge is submerged below the surface of the glass to prevent interference with the movement of the surface glass caused by the movement of the molds in the curved central portion 30 of the opening 29.

The molds enter at one end of the curved portion 30 of the opening 29 of the member 28 and sweep along the said portion of the opening and rise in the vicinity of the bridge 37 at which point the glass which adheres to the molds is severed from the molds and is allowed to drop into the portion 34 of the opening. The bridge 37 prevents the return of the glass that may occur by reason of the upward movement of the molds as they are raised from the glass and also prevents possible clogging of the end of the portion 30 of the opening which might otherwise prevent free movement of the glass into the portion 34 of the opening.

In the form of construction shown, the molds move counterclock-wise and sweep along the surface of the glass and move the glass that is chilled by contact with the molds as well as chilled by the exposure of the glass to lower temperature into the larger end portion 34 of the opening and underneath the wall 9 and into the furnace where the glass thus chilled is reheated by direct radiation from the burners of the furnace and subjected to the general temperature of the furnace. In the same sweeping movement of each mold, the hot surface glass is drawn from the interior of the furnace and underneath the wall 9 and in position to feed the succeeding mold, each succeeding mold operating in the same manner to circuitously move the colder surface glass into the furnace and to draw the hotter glass from the furnace. Thus, where colored glass is formed into articles, the molds gather the hotter surface glass which receives its more immediate heat by radiation from the furnace flames and disposes the glass chilled by contact with the molds and by exposure to the atmospheric temperature in position to receive the direct radiation of the burner 4 which is preferably disposed within the furnace at a point near the end of the glass shelf from whence the colder glass is directed into the furnace and produce "sting-outs" that heat the surface glass at the intake and delivery points in the opening of the floatable member between which the molds operate to gather glass.

I claim:
1. In combination with a glass shelf of a glass furnace, the furnace having a wall overhanging the glass surface of the shelf, a refractory member having an edge part substantially fitting the interior of the shelf and floatable on the surface of the glass in the shelf and extending beneath the overhanging wall and into the furnace and having an opening extending from the rear edge and one end of the refractory member located within the furnace and through the part of the refractory member in the shelf and to near the rear edge and the other end of the member located within the furnace, a suction gathering mold, and means for moving the mold along and into the part of the said opening located in the shelf and into the surface of the glass in the said part of the opening.

2. In combination with a glass shelf for glass furnaces, the furnace having a wall depending to near the surface of the glass, a refractory member having an edge part substantially fitting the interior of the shelf and floatable on the surface of the glass in the shelf, and extending rearwardly beneath the said wall and into the furnace and having an opening extending from near one end and from near the rear edge of the said member and along the shelf and to near the other end of the said member and near the said rear edge of the member, the portion of the opening located within the shelf being substantially circular and the end portions of the opening formed by edges that flare relative to each other to increase the width of the said end portions of the openings within the furnace, a suction gathering mold, and means for moving the mold circularly along and into the surface of the glass in the shelf and in the opening.

3. In combination with a glass shelf of a glass furnace, the furnace having a wall overhanging the surface of the glass in the shelf, a refractory member substantially fitting the inner edge of the shelf of the furnace and extending beneath the over-hanging wall into the furnace and well to the rear of the wall and floatable on the surface of the glass and having an opening extending along the edge of the shelf and into the furnace well to the rear of the wall, a suction gathering mold, means for moving the mold into the surface of the glass in the shelf and along the part of the opening located in the shelf for drawing the hot surface glass from the part of the opening located in the furnace at the rear of the wall.

FRANZ G. SCHWALBE.